US011068896B2

(12) United States Patent
Skordas et al.

(10) Patent No.: US 11,068,896 B2
(45) Date of Patent: Jul. 20, 2021

(54) GRANTING REQUESTS FOR AUTHORIZATION USING DATA OF DEVICES ASSOCIATED WITH REQUESTORS

(71) Applicant: INTERNATIONAL BUSINESS MACHINES CORPORATION, Armonk, NY (US)

(72) Inventors: Spyridon Skordas, Troy, NY (US); Lawrence A. Clevenger, Rhinebeck, NY (US); Richard C. Johnson, Selkirk, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 189 days.

(21) Appl. No.: 15/827,181

(22) Filed: Nov. 30, 2017

(65) Prior Publication Data

US 2019/0164163 A1    May 30, 2019

(51) Int. Cl.
*G06Q 50/26*    (2012.01)
*G06Q 20/40*    (2012.01)

(52) U.S. Cl.
CPC ..... *G06Q 20/4016* (2013.01); *G06Q 20/4014* (2013.01); *G06Q 50/265* (2013.01)

(58) Field of Classification Search
CPC ........... G06Q 20/4016; G06Q 20/4014; G06Q 50/265
See application file for complete search history.

(56) References Cited

U.S. PATENT DOCUMENTS

| 7,398,925 | B2 | 7/2008 | Tidwell et al. |
| 9,348,896 | B2 | 5/2016 | Faith et al. |
| 9,390,412 | B2 | 7/2016 | Weber et al. |
| 9,569,767 | B1* | 2/2017 | Lewis ................. G06Q 20/4016 |
| 10,354,251 | B1* | 7/2019 | Gailloux ............ G06Q 20/4016 |
| 10,432,605 | B1* | 10/2019 | Lester ..................... H04L 63/20 |
| 2005/0172335 | A1* | 8/2005 | Aday .................. H04L 63/0823 726/10 |
| 2006/0161435 | A1* | 7/2006 | Atef ....................... G07F 7/1008 704/246 |

(Continued)

OTHER PUBLICATIONS

Singh et al., "Developing a measure of risk adjusted revenue (RAR) in credit cards market: Implications for customer relationship management", European Journal of Operational Research 224, Elsevier, Jan. 22, 2009, 10 pages.

(Continued)

*Primary Examiner* — Edward Chang
*Assistant Examiner* — William D Newlon
(74) *Attorney, Agent, or Firm* — Michael O'Keefe; Andrew D. Wright; Roberts Calderon Safran & Cole, P.C.

(57) ABSTRACT

Devices and methods for granting requests for authorization using data of devices associated with requestors are disclosed. A method includes: receiving, by a computing device, a request for authorization; receiving, by the computing device, identification information for at least one device of a requestor; determining, by the computing device, a risk score using the received identification information for the at least one device of the requestor; and in response to the risk score exceeding a predetermined threshold, the computing device granting the request for authorization.

2 Claims, 6 Drawing Sheets

(56) References Cited

U.S. PATENT DOCUMENTS

2016/0371698 A1\* 12/2016 Adler ................. G06Q 20/4014
2018/0341758 A1\* 11/2018 Park ..................... G06F 21/316

OTHER PUBLICATIONS

Godlove, "Regulatory Overview of Virtual Currency", Oklahoma Journal of Law and Technology, vol. 10, No. 1, Jan. 2014, 68 pages.
Goto, "E-commerce in the Japanese Non-life Insurance Market", accessed Nov. 28, 2017, 17 pages.
Mell et al., "The NIST Definition of Cloud Computing", NIST, Special Publication 800-145, Sep. 2011, 7 pages.

\* cited by examiner

US 11,068,896 B2

GRANTING REQUESTS FOR AUTHORIZATION USING DATA OF DEVICES ASSOCIATED WITH REQUESTORS

BACKGROUND

The present invention generally relates to computing devices and, more particularly, to a system and method for granting requests for authorization using data of devices associated with requestors.

Granting a request for authorization (e.g., a request to authorize a transaction) may require verification of a driver's license or another form of identification in order to confirm an identity of a requestor (e.g., a person initiating the transaction). In the case of the transaction being a payment transaction, this identity verification may confirm that the requestor is using a payment instrument belonging to the requestor. Accordingly, by performing identity verification, the occurrence of fraudulent transactions (e.g., a requestor using a payment instrument belonging to another person) may be reduced.

Alternatively, a two-step verification process may be required in order to grant a request for authorization. For example, the two-step verification process may require the verification of two government-issued forms of identification in order to confirm an identify of the requestor. This two-step verification process may provide confirmation of the identity of the requestor with a high degree of certainty.

SUMMARY

In a first aspect of the invention, there is a method that includes: receiving, by a computing device, a request for authorization; receiving, by the computing device, identification information for at least one device of a requestor; determining, by the computing device, a risk score using the received identification information for the at least one device of the requestor; and in response to the risk score exceeding a predetermined threshold, the computing device granting the request for authorization.

In another aspect of the invention, there is a computer program product that includes a computer readable storage medium having program instructions embodied therewith. The program instructions are executable by a computing device to cause the computing device to: receive identification information for at least one device of a requestor; determine a risk score using the received identification information for the at least one device of the requestor; in response to the risk score exceeding a predetermined threshold, grant a request for authorization; and in response to the risk score not exceeding the predetermined threshold, request at least one of additional identification information or history information for the at least one device of the requestor.

In another aspect of the invention, there is a system that includes: a hardware processor, a computer readable memory, and a computer readable storage medium associated with a computer device; program instructions of an authorization request receiver configured to receive a request for authorization; program instructions of a device information receiver configured to receive identification information for at least one device of a requestor; program instructions of a risk analyzer configured to determine a risk score using the identification information for the at least one device of the requestor received by the device information receiver; and program instructions of an authorizer configured to, in response to the risk score determined by the risk analyzer exceeding a predetermined threshold, grant the request for authorization.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
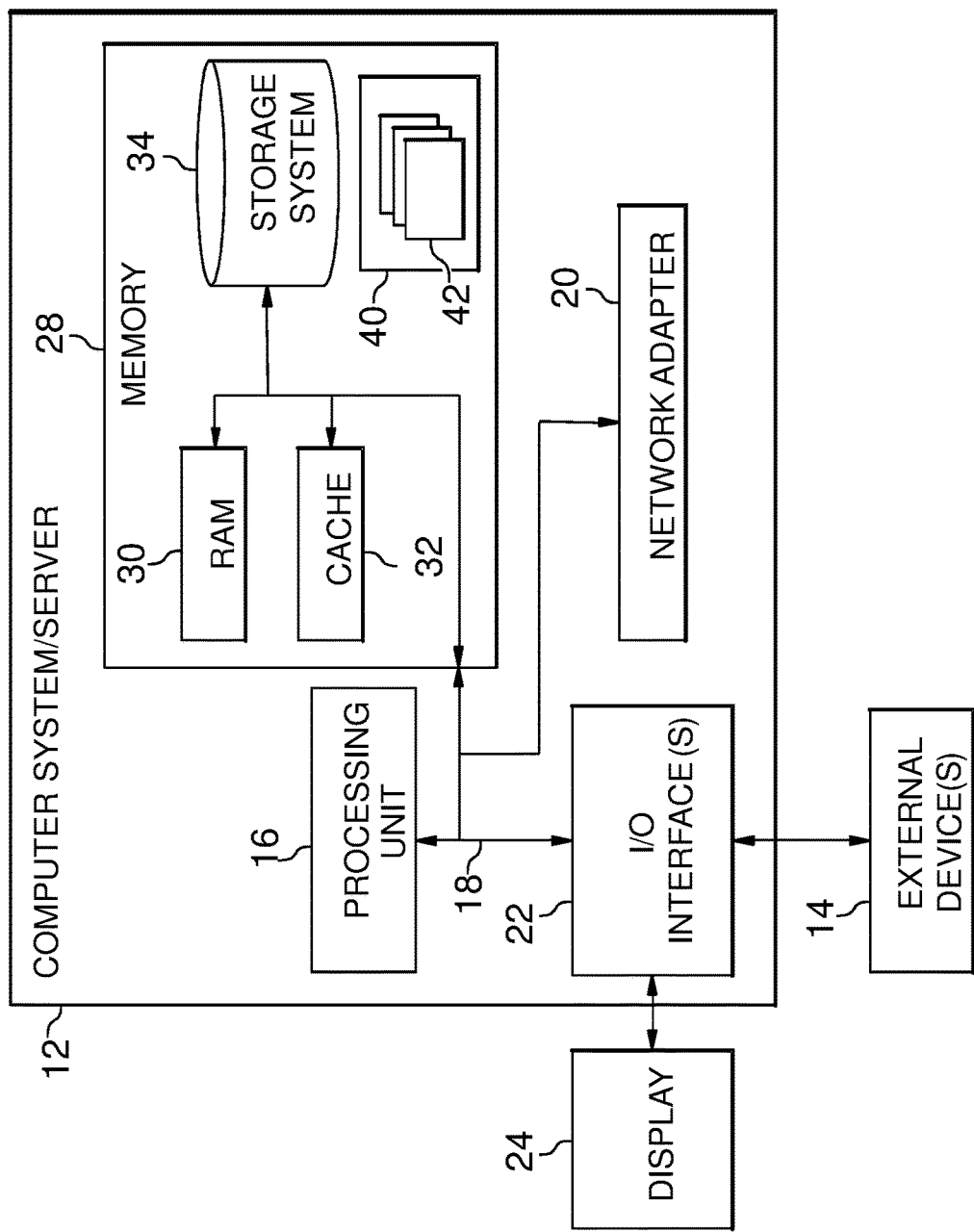
FIG. 1 depicts a cloud computing node in accordance with aspects of the invention.

The present invention generally relates to computing devices and, more particularly, to a system and method for granting requests for authorization using data of devices associated with requestors. At various times, the requestor may be unable to complete a required verification of the requestor's identity or any other verification process required to proceed with the transaction. For example, the requestor may have forgotten his or her driver's license or other form of identification, it may have been lost or misplaced, or it may not be in the requestor's immediate possession for any other reason. Alternatively, the requestor may only have one form of identification, but the transaction may require the two-step verification process using multiple forms of identification for verification. In another case, the requestor's credit card may be lost or misplaced, and therefore a credit card verification process may be unable to be completed. In all of these cases, the requestor may be unable to complete a desired transaction, to the detriment of the requestor, a business associated with the transaction, and a bank associated with the transaction.

Aspects of the invention are directed to receiving identification information from devices that are uniquely connected to a requestor, performing a risk analysis using the received identification information, and determining whether or not to authorize the transaction based upon the risk analysis. As described herein, aspects of the invention may include determining a premium (e.g., a fee or surcharge that may be an amount or a percentage) to be added to the transaction in exchange for the system enabling the transaction to proceed.

Other aspects of the invention may include receiving additional information from the devices associated with the requestor based upon the risk analysis, performing an updated risk analysis using the additional information, and determining whether or not to authorize the transaction based upon the updated risk analysis. Other aspects of the invention may also include automatically contacting one or more third parties on-demand that may provide identity validation or creditworthiness information for a requestor. Still other aspects of the invention may include contacting one or more third parties that may acquire the transaction and charge a premium in exchange for enabling the transaction to proceed, providing improved risk mitigation. Additionally, a third party may agree to pay a premium to in exchange for the system enabling the transaction to proceed.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
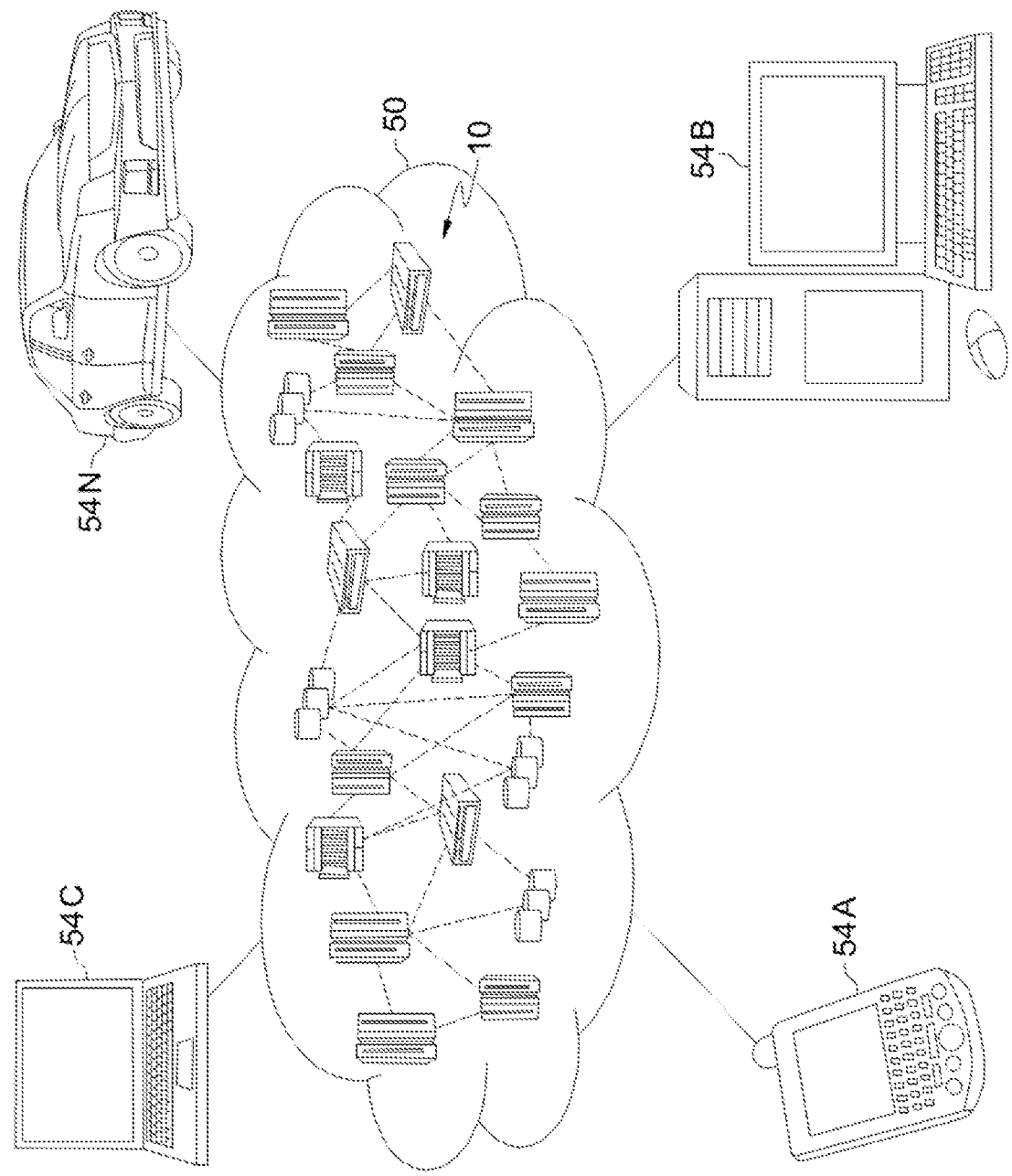
FIG. 2 depicts a cloud computing environment in accordance with aspects of the invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
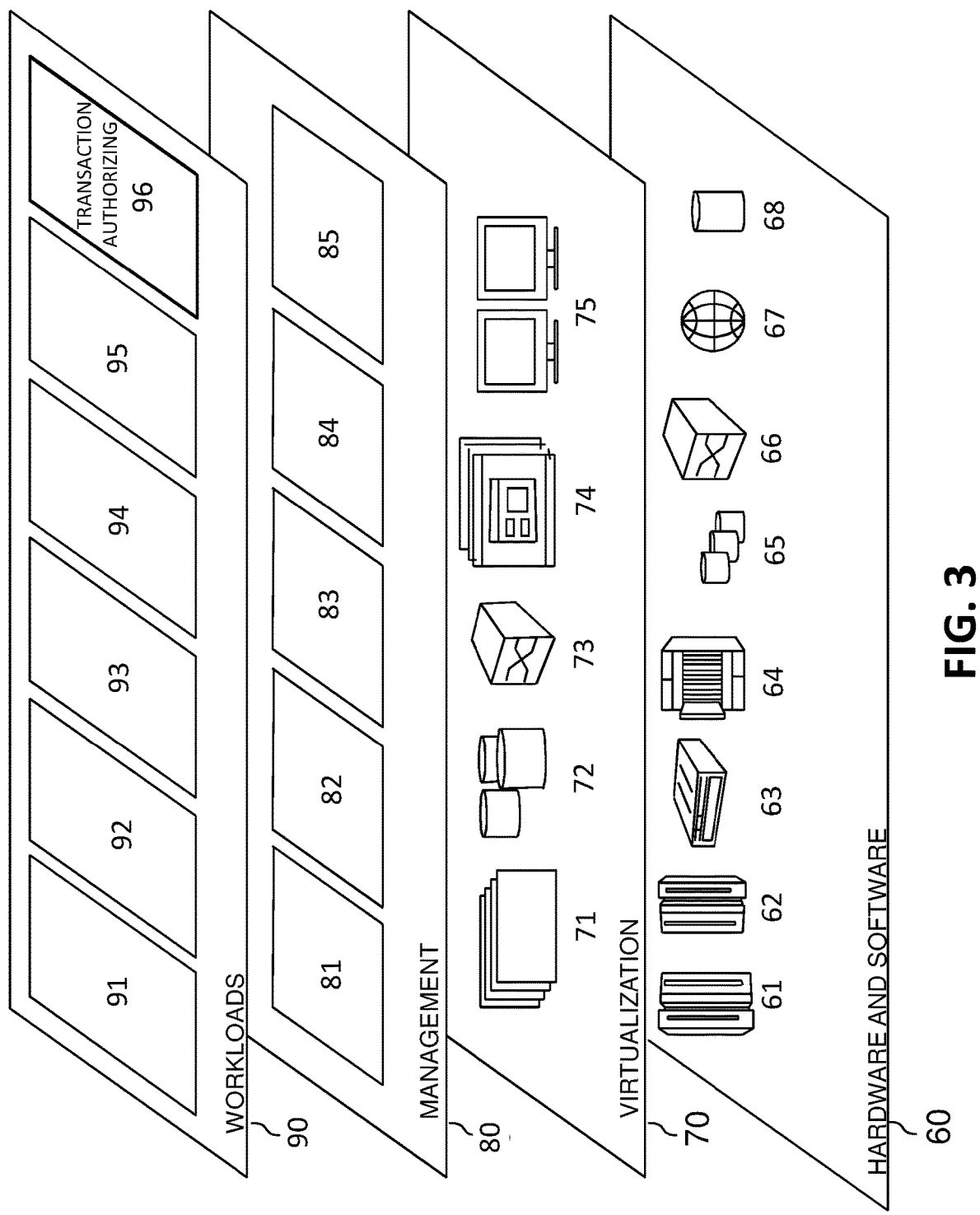
FIG. 3 depicts abstraction model layers in accordance with aspects of the invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and transaction authorizing 96.

Referring back to FIG. 1, the program/utility 40 may include one or more program modules 42 that generally carry out the functions and/or methodologies of embodiments of the invention as described herein (e.g., such as the functionality provided by transaction authorizing 96). Specifically, the program modules 42 may receive identification information from devices associated with a user, perform a risk analysis, and determine whether or not to allow a transaction to proceed with an added premium. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a transaction authorizing program module 420 as shown in FIGS. 4 and 5.

Figure 4:
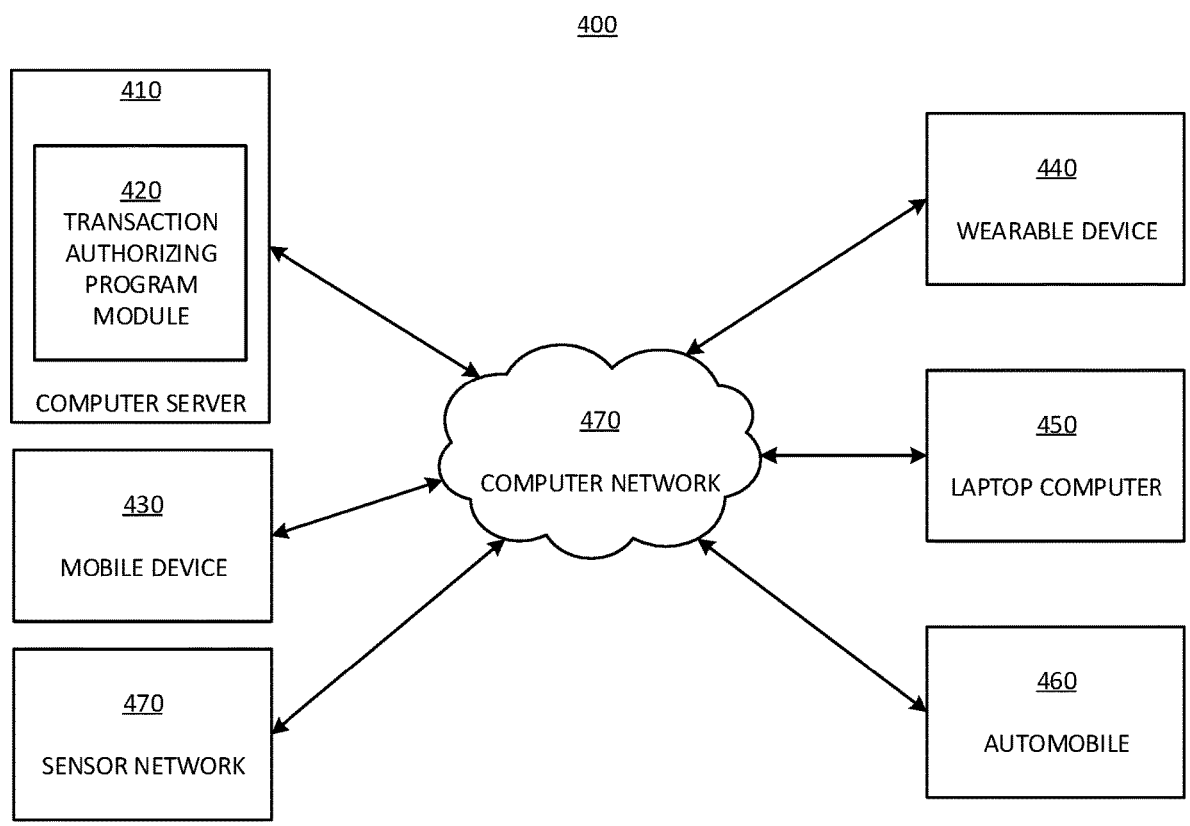
FIG. 4 depicts an illustrative environment in accordance with aspects of the invention.
Figure 5:
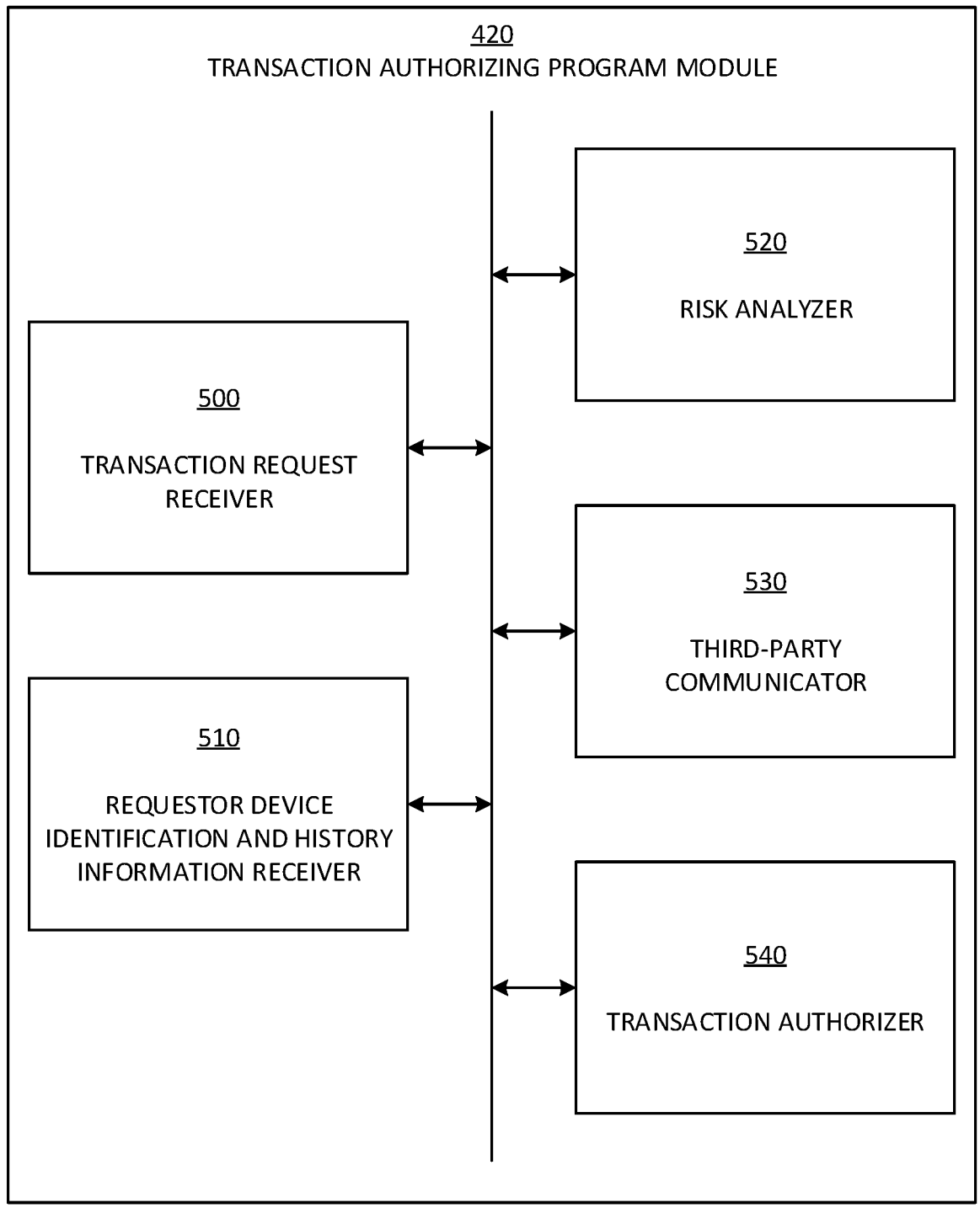
FIG. 5 depicts a block diagram of an exemplary program module in accordance with aspects of the invention.

FIG. 4 depicts an illustrative environment 400 in accordance with aspects of the invention. As shown, the environment 400 comprises a computer server 410 which is in communication with a mobile device 430, a wearable device 440, a laptop computer 450, and an automobile 460 via a computer network 470. The computer network 470 may be any suitable communication network such as a LAN, WAN, or the Internet. The computer server 410, the mobile device 430, the wearable device 440, the laptop computer 450, and the automobile 460 may be physically collocated, or may be situated in separate physical locations.

The environment 400 may include a plurality of mobile devices 430, wearable devices 440, laptop computers 450, and automobiles 460 that may be associated with (e.g., used by or owned by) a plurality of requestors. The quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4. Also, in some implementations, one or more of the devices of the environment 400 may perform one or more functions described as being performed by another one or more of the devices of the environment 400.

In embodiments, the computer server 410 may be a server 12 shown in FIG. 1 and may be situated in the cloud computing environment 50 at one or more of the nodes 10 shown in FIG. 2. The computer server 410 may be implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3.

In embodiments, the computer server 410 may include a transaction authorizing program module 420, which may include hardware and/or software and may be one or more of the program modules 42 shown in FIG. 1. According to an embodiment, the transaction authorizing program module 420 includes program instructions for a cognitive system for authorizing transactions using data obtained from devices associated with a requestor, such as the mobile device 430, the wearable device 440, the laptop computer 450, and/or the automobile 460. The program instructions included in the transaction authorizing program module 420 of the computer server 410 may be executed by one or more hardware processors.

According to an embodiment, the transaction authorizing program module 420 performs functions related to receiving identification information from devices associated with a requestor, performing a risk analysis using the received identification information, and determining whether or not to authorize a transaction based upon the risk analysis. The transaction authorizing program module 420 may also perform functions related to determining a premium to be added to the transaction in exchange for the system enabling the transaction to proceed, receiving additional information from the devices associated with the requestor based upon the risk analysis, performing an updated risk analysis using the additional information, and determining whether or not to authorize the transaction based upon the updated risk analysis. The transaction authorizing program module 420 may further perform functions related to communicating with one or more third parties that may provide identity validation or creditworthiness information for a requestor, communicating with one or more third parties that may acquire the transaction and charge a premium in exchange for enabling the transaction to proceed, and communicating with one or more third parties that may agree to pay a premium to in exchange for the system enabling the transaction to proceed.

Still referring to FIG. 4, in embodiments, the mobile device 430 may be any type of mobile telephone, tablet, or other mobile computing system that is that is used by a requestor. The mobile device 430 may communicate directly with the network 470 or may communicate with the network 470 via a cellular network or other network. The mobile device 430 may collect data that is usable to determine or estimate activities and/or a location of the requestor. In embodiments, the mobile device 430 may transmit collected data (e.g., activity data and/or location data) to the computer server 410 via the network 470 and using a Bluetooth, Wi-Fi, or cellular connection, or via any other networking technology, for use by the transaction authorizing program module 420 as described herein. The mobile device 430 may transmit the data in response to a request received from the computer server 410. Alternatively, the mobile device 430 may push the aforementioned data to the computer server 410, either at predetermined intervals or in response to a predetermined trigger condition, such as a change in an activity status of the requestor indicated by the activity data or a change in a location of the requestor indicated by the location data. According to an embodiment, a software application may be installed on the mobile device 430 that is programmed to perform the aforementioned transmission of data in response to a request received from the computer server 410 and/or the aforementioned data push to the computer server 410.

In embodiments, the wearable device 440 may be any type of computer-based activity tracker, fitness tracker, smart watch, sleep tracker, biosensor device, or other device that tracks information related to activity, fitness, location, and/or health. The wearable device 440 may collect data that is usable to determine or estimate activities and/or a location of the wearer (e.g., the requestor). In embodiments, the wearable device 440 may transmit collected data (e.g., activity data and/or location data) to the computer server 410 via the network 470 and using a Bluetooth, Wi-Fi, or cellular connection, or via any other networking technology, for use by the transaction authorizing program module 420 as described herein. The wearable device 440 may transmit the data in response to a request received from the computer server 410. Alternatively, the wearable device 440 may push the aforementioned data to the computer server 410, either at predetermined intervals or in response to a predetermined trigger condition, such as a change in an activity status of the requestor indicated by the activity data or a change in a location of the requestor indicated by the location data. According to an embodiment, a software application may be installed on the wearable device 440 that is programmed to perform the aforementioned transmission of data in response to a request received from the computer server 410 and/or the aforementioned data push to the computer server 410.

According to alternative embodiments, the wearable device 440 may communicate with the mobile device 430 or other computing device associated with the requestor (e.g., the wearer of the wearable device 440) via a Bluetooth, Wi-Fi, or cellular connection, or via any other networking technology. According to an embodiment, one or more software applications may be installed on the wearable device 440 and/or the mobile device 430 or other computing device that are programmed to perform the communication between the wearable device 440 and the mobile device 430 or other computing device. The software application installed on the mobile device 430 or other computing device may request and receive data collected by the wearable device 440 (e.g., activity data and/or location data). Alternatively, the wearable device 440 may use the software application installed thereon to push the aforementioned data to the mobile device 430 or other computing device, and the software application installed on the mobile device 430 may receive the pushed data.

According to an embodiment, a software application running on the mobile device 430 or other computing device may be programmed to transmit collected data (e.g., activity data and/or location data) to the computer server 410 via the network 470 and using a Bluetooth, Wi-Fi, or cellular connection, or via any other networking technology, for use by the transaction authorizing program module 420 as described herein. This may be the same software application as the one or more software applications installed on the mobile device 430 or other computing device that are programmed to perform the communication between the wearable device 440 and the mobile device 430 or other computing device. Alternatively, the software application that is programmed to transmit certain collected data to the computer server 410 may be a separate software application from the one or more software applications installed on the mobile device 430 or other computing device that are programmed to perform the communication between the wearable device 440 and the mobile device 430 or other computing device. The software application may be programmed to transmit the data in response to a request received from the computer server 410. Alternatively, the software application may push the aforementioned data to the computer server 410, either at predetermined intervals or in response to a predetermined trigger condition, such as a change in an activity status of the requestor indicated by the activity data or a change in a location of the requestor indicated by the location data.

Still referring to FIG. 4, in embodiments, the laptop computer 450 may be a laptop computer, notebook computer, netbook, or any other type of computer that is that is used by a requestor. The laptop computer 450 may collect data that is usable to determine or estimate activities and/or a location of the requestor. In embodiments, the laptop computer 450 may transmit collected data (e.g., activity data and/or location data) to the computer server 410 via the network 470 and using a Bluetooth, Wi-Fi, or cellular connection, or via any other networking technology, for use by the transaction authorizing program module 420 as described herein. The laptop computer 450 may transmit the data in response to a request received from the computer server 410. Alternatively, the laptop computer 450 may push the aforementioned data to the computer server 410, either at predetermined intervals or in response to a predetermined trigger condition, such as a change in an activity status of the requestor indicated by the activity data or a change in a location of the requestor indicated by the location data. According to an embodiment, a software application may be installed on the laptop computer 450 that is programmed to perform the aforementioned transmission of data in response to a request received from the computer server 410 and/or the aforementioned data push to the computer server 410.

In embodiments, the automobile 460 may be a car, truck, or any other type of vehicle that is used by a requestor and may include a computer system 12 (of FIG. 1). The automobile 460 may collect data that is usable to determine or estimate a location of the requestor. In embodiments, the automobile 460 may transmit collected data (e.g., location data) to the computer server 410 via the network 470 and using a Bluetooth, Wi-Fi, or cellular connection, or via any other networking technology, for use by the transaction authorizing program module 420 as described herein. The automobile 460 may transmit the data in response to a request received from the computer server 410. Alternatively, the automobile 460 may push the aforementioned data to the computer server 410, either at predetermined intervals or in response to a predetermined trigger condition, such as a change in a location of the requestor indicated by the location data. According to an embodiment, a software application may be installed on the automobile 460 that is programmed to perform the aforementioned transmission of data in response to a request received from the computer server 410 and/or the aforementioned data push to the computer server 410.

FIG. 5 shows a block diagram of an exemplary transaction authorizing program module 420 in the server 410 (of FIG. 4) in accordance with aspects of the invention. In embodiments, the transaction authorizing program module 420 includes a transaction request receiver 500, a requestor device identification and history information receiver 510, a risk analyzer 520, a third-party communicator 530, and a transaction authorizer 540, each of which may comprise one or more program modules 42 as described with respect to FIG. 1.

According to an alternative embodiment, one or more of the transaction request receiver 500, the requestor device identification and history information receiver 510, the risk analyzer 520, the third-party communicator 530, and the transaction authorizer 540 may be implemented in one or more separate computer servers 410 in one or more physical locations. For example, the requestor device identification and history information receiver 510 may be implemented in a computer server 410 located at a hotel reception desk, and the transaction request receiver 500, the risk analyzer 520, the third-party communicator 530, and the transaction authorizer 540 may be implemented in a computer server 410 located at a service provider facility. In embodiments, transaction authorizing program module 420 may include additional or fewer components than those shown in FIG. 5. In embodiments, separate components may be integrated into a single computing component or module. Additionally, or alternatively, a single component may be implemented as multiple computing components or modules.

In embodiments, transaction request receiver 500 receives a request to authorize a transaction (e.g., from a requestor, or in response to a request by a requestor). The transaction request receiver 500 may receive the request from a merchant (e.g., in response to a request by a requestor, via a point of sale system), the merchant's customer (e.g., from a requestor, via an application installed on a mobile device 430), a bank (e.g., in response to a request by a requestor, via a payment processing system), or any other party. The transaction may be a payment transaction or other transaction. The transaction may fail to satisfy conventional authorization criteria for any reason. For example, the transaction may fail to satisfy security criteria due to an inability to verify a driver's license or other form of identification in order to confirm an identity of a requestor. Alternatively, a requestor may have a lost or damaged credit card. Accordingly, it may not be possible to confirm that the requestor is using a payment instrument belonging to the requestor using conventional authorization criteria.

In embodiments, the requestor device identification and history information receiver 510, in response to the transaction request receiver 500 receiving the request to authorize the transaction, requests device identification information from a plurality of devices associated with the requestor. For example, the requestor device identification and history information receiver 510 may request identification information from one or more of the mobile device 430, the wearable device 440, the laptop computer 450, the automobile 460, and any other devices that can transmit data (e.g., smart clothes, smart glasses, smart goggles, Bluetooth devices, etc.) that are associated with the requestor.

In response to receiving the request for identification information, the mobile device 430, the wearable device 440, the laptop computer 450, the automobile 460, and any other devices that are associated with the requestor may transmit identification information that is received by the requestor device identification and history information receiver 510. The identification information may include information stored by each device that uniquely identifies the device and the identity of the user (e.g., the requestor) associated with the device.

According to another embodiment, the requestor device identification and history information receiver 510 may be implemented by a computer server 410 and a sensor network 470. The sensor network 470 may include a plurality of hardware sensors such as Bluetooth sensors, Wi-Fi sensors, radio-frequency identification (RFID) sensors, or any other sensors that are configured to detect a presence of and/or communicate with the mobile device 430, the wearable device 440, the laptop computer 450, the automobile 460, and any other devices that are associated with the requestor. The sensors in the sensor network 470 may be located in a store (e.g., at a point of sale terminal), in a parking lot, or at any other location. In response to a requestor using a payment instrument (e.g., swiping, inserting, or tapping a payment card or payment device), the point of sale terminal may send a request to authorize the transaction to the transaction request receiver 500. In response to the transaction request receiver 500 receiving the request to authorize the transaction, the requestor device identification and history information receiver 510 may cause one or more sensors in the sensor network 470 to sense or to request and receive device identification information from a plurality of devices associated with the requestor, including one or more of the mobile device 430, the wearable device 440, the laptop computer 450, the automobile 460, and any other devices that can transmit data (e.g., smart clothes, smart glasses, smart goggles, Bluetooth devices, etc.).

In embodiments, the risk analyzer 520 analyzes the identification information received by the requestor device identification and history information receiver 510 to determine a risk level and determine a score for the transaction corresponding to the determined risk level. The risk analyzer 520 may be programmed to use dynamic algorithms that continue learning based on each transaction to assess the identification information received by the requestor device identification and history information receiver 510 to determine the risk level based upon a degree of confidence that an identity claimed by the requestor attempting to complete the transaction matches the identity of the user associated with the devices.

According to an embodiment, the risk analyzer 520 may determine a comparatively higher score indicating a comparatively lower risk level if there is a comparatively large amount of identification information received by the requestor device identification and history information receiver 510 that confirms that the identity of the user associated with the devices matches the identity claimed by the requestor. On the other hand, the risk analyzer 520 may determine a comparatively lower score indicating a comparatively greater risk level if there is a comparatively small amount of identification information received by the requestor device identification and history information receiver 510 that confirms that the identity of the user associated with the devices matches the identity claimed by the requestor.

For example, the risk analyzer 520 may determine a comparatively higher score indicating a comparatively lower risk level if identification information is received from all of the mobile device 430, the wearable device 440, the laptop computer 450, and the automobile 460 confirming that the identity of the user associated with the devices matches the identity claimed by the requestor. On the other hand, the risk analyzer 520 may determine a comparatively lower score indicating a comparatively higher risk level if identification information is received from only the wearable device 440 confirming that the identity of the user associated with the device matches the identity claimed by the requestor.

In embodiments, the transaction authorizer 540 may authorize the transaction in response to the score determined by the risk analyzer 520 exceeding a predetermined threshold, which may represent a maximum acceptable level of risk. The transaction authorizer 540 may also determine a premium for the system providing the authorization service and enabling the transaction. The premium may be billed to and/or paid by the requestor, a merchant, a bank, or any other party. The transaction authorizer 540 may use a sliding premium scale, determining a higher premium for riskier transactions (i.e., transactions having a comparatively lower score determined by the risk analyzer 520) and determining a lower premium for less risky transactions (i.e., transactions having a comparatively higher score determined by the risk analyzer 520). The premiums may be dynamically determined by the transaction authorizer 540 based upon historical data regarding participation, transactions, and fraud.

If the score determined by the risk analyzer 520 does not exceed the predetermined threshold, the transaction authorizer 540 may request that the requestor device identification and history information receiver 510 request additional device identification information and device history information from one or more of a plurality of devices associated with the requestor. For example, the requestor device identification and history information receiver 510 may request additional identification and history information from the mobile device 430, the wearable device 440, the laptop computer 450, the automobile 460, and any other devices that can transmit data that are associated with the requestor.

In response to receiving the request for additional identification and history information, at least one of the mobile device 430, the wearable device 440, the laptop computer 450, the automobile 460, and any other devices that are associated with the requestor may transmit additional identification and history information that is received by the requestor device identification and history information receiver 510. The additional identification information may include information stored by each device that uniquely identifies the device and the identity of the user (e.g., the requestor) associated with the device. The history information may include a recent location, a location history, information about recent activity, recent communications, or any other history stored by each device.

In embodiments, if the score determined by the risk analyzer 520 does not exceed the first predetermined threshold, the transaction authorizer 540 may also request that the third-party communicator 530 contact one or more third parties to request identity validation and/or creditworthiness information for the requestor. The one or more third parties may provide, and the third-party communicator 530 may receive, identity validation information usable to confirm the identity and/or creditworthiness information of the requestor.

In embodiments, the risk analyzer 520 performs an updated analysis using the additional identification and history information and/or creditworthiness information received by the third-party communicator 530 to determine an updated risk level and determine an updated score for the transaction corresponding to the updated risk level. The risk analyzer 520 may be programmed to use dynamic algorithms that continue learning based on each transaction to assess the additional identification and history information and/or creditworthiness information received by the requestor device identification and history information receiver 510 to determine the updated risk level based upon a degree of confidence that an identity claimed by the requestor matches the identity of the user associated with the devices and/or that the creditworthiness information indicates an acceptable credit risk. For example, the risk analyzer 520 may use the location history received from the devices to determine if the location information associated with the devices corresponds with a known location for the requestor (e.g., based upon other reservations and/or calendar information).

In embodiments, the transaction authorizer 540 may authorize the transaction in response to the updated score determined by the risk analyzer 520 exceeding the predetermined threshold. The transaction authorizer 540 may determine a premium based on the updated score. If the updated score does not exceed the predetermined threshold, the transaction authorizer may continue to request that the requestor device identification and history information receiver 510 and/or the third-party communicator 530 request and receive additional information, and the risk analyzer 520 continue to update the score using the newly received information, until either the predetermined threshold is exceeded (i.e., the transaction authorizer 540 may authorize the transaction) or a predetermined number of iterations has been reached without exceeding the predetermined threshold (i.e., the transaction authorizer 540 does not authorize the transaction).

In the event that the predetermined threshold is exceeded, the transaction authorizer 540 may authorize the transaction and determine a premium for the system providing the authorization service and enabling the transaction. On the other hand, in the event that the predetermined threshold is not exceeded, the transaction authorizer 540 may decline to authorize the transaction. When the transaction authorizer 540 declines to authorize a transaction, the transaction authorizer 540 may determine a premium for the failed transaction in exchange for the on-demand security service provided by the system. According to an embodiment, the transaction authorizer 540 may determine that this premium is to be charged to a user whose identity is claimed by the requestor, regardless of whether or not the requestor is the same person as the user. Alternatively, the transaction authorizer 540 may determine that this premium is to be charged to a merchant, a bank, or any other party.

In embodiments, if the score determined by the risk analyzer 520 does not exceed the predetermined threshold, the transaction authorizer 540 may also contact one or more third parties that may agree to acquire the transaction. The third parties may assume the risk associated with the transaction in exchange for charging a premium for the transaction, as a secondary market provider.

In another embodiment, the third-party communicator 530 may communicate with one or more third parties that agree to pay the premium for the transaction. For example, a third-party advertising provider may pay the premium in exchange for access to data received by the requestor device identification and history information receiver 510.

Figure 6:
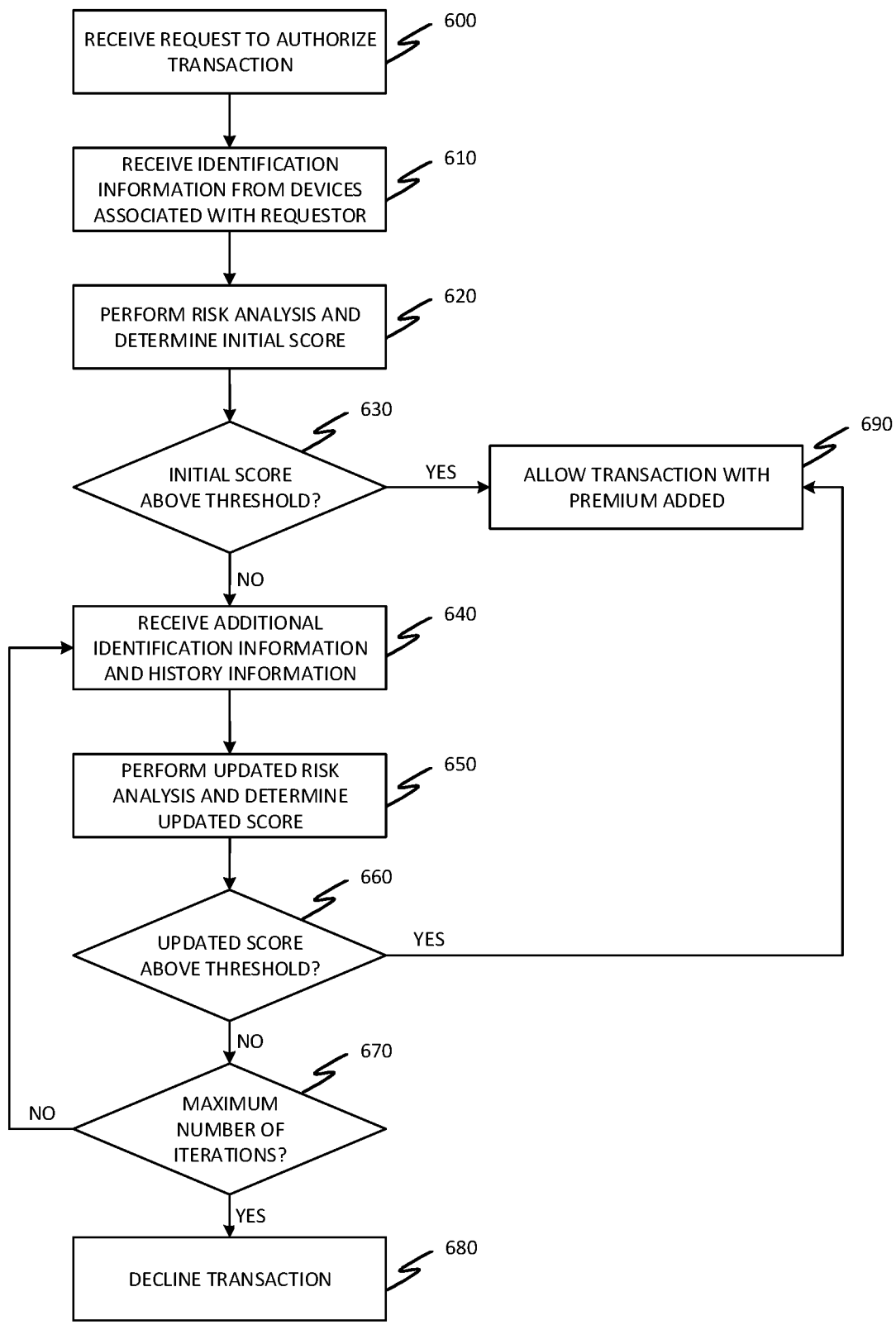
FIG. 6 depicts exemplary methods in accordance with aspects of the invention.

FIG. 6 depicts exemplary methods in accordance with aspects of the invention. The steps of the method may be performed in the environment of FIG. 4 and are described with reference to the elements and steps described with respect to FIGS. 1, 2, 4, and 5.

At step 600, the system receives a request to authorize a transaction (e.g., from a requestor, or in response to a request by a requestor). In embodiments, as described with respect to FIG. 5, step 600 comprises the transaction request receiver 500 receiving the request from a merchant (e.g., in response to a request by a requestor, via a point of sale system), the merchant's customer (e.g., from a requestor, via an application installed on a mobile device 430), or a bank (e.g., in response to a request by a requestor, via a payment processing system).

At step 610, the system receives identification information from devices associated with the requestor associated with the request received at step 600. In embodiments, as described with respect to FIG. 5, step 610 comprises the requestor device identification and history information receiver 510 requesting and receiving device identification information from a plurality of devices associated with the requestor.

At step 620, the system performs a risk analysis and determines an initial score. In embodiments, as described with respect to FIG. 5, step 620 comprises the risk analyzer 520 analyzing the identification information received at step 610 to determine a risk level and determine a score for the transaction corresponding to the determined risk level.

At step 630, the system determines whether or not the initial score is above a predetermined threshold. In embodiments, as described with respect to FIG. 5, step 630 comprises the transaction authorizer 540 determining whether or not the score determined at step 620 exceeds a predetermined threshold, which may represent a maximum acceptable level of risk. If it is determined in step 630 that the initial score is above the predetermined threshold, the flow proceeds to step 690, and the transaction is allowed with a premium added. In embodiments, as described with respect to FIG. 5, step 690 comprises the transaction authorizer 540 authorizing the transaction and determining the premium based on the score determined at step 620 or step 650. On the other hand, if it is determined in step 630 that the initial score is not above the predetermined threshold, the flow proceeds to step 640.

At step 640, the system receives additional identification information and/or history information from devices associated with the requestor. In embodiments, as described with respect to FIG. 5, step 640 comprises the requestor device identification and history information receiver 510 requesting and receiving additional device identification information and device history information from a plurality of devices associated with the requestor.

At step 650, the system performs an updated risk analysis and determines an updated score. In embodiments, as described with respect to FIG. 5, step 650 comprises the risk analyzer 520 performing an updated analysis using the additional identification and history information received at step 640 to determine an updated risk level and determine an updated score for the transaction corresponding to the updated risk level.

At step 660, the system determines whether or not the updated score is above the predetermined threshold. In embodiments, as described with respect to FIG. 5, step 660 comprises the transaction authorizer 540 determining whether or not the updated score determined at step 650 exceeds the predetermined threshold. If it is determined in step 660 that the updated score is above the predetermined threshold, the flow proceeds to step 690, and the transaction is allowed with a premium added. On the other hand, if it is determined in step 660 that the updated score is not above the predetermined threshold, the flow proceeds to step 670.

At step 670, the system determines whether or not the maximum number of iterations has been reached. In embodiments, as described with respect to FIG. 5, step 670 comprises the transaction authorizer 540 determining whether or not a predetermined number of iterations has been reached without the updated score exceeding the predetermined threshold. If it is determined in step 670 that the maximum number of iterations has not been reached, then the flow returns to step 640. On the other hand, if it is determined in step 670 that the maximum number of iterations has been reached, then the flow proceeds to step 680, and the transaction is declined.

While aspects of the present invention may receive data that is usable to determine or estimate activities and/or a location of a requestor from devices associated with the requestor including the mobile device 430, the wearable device 440, the laptop computer 450, and the automobile 460 of FIG. 4, receiving this data may occur on an "opt-in" basis in which a requestor provides explicit permission for the system to receive the data. Further, location tracking may be implemented in accordance with applicable privacy laws and may be discontinued at any time for requestors who have revoked permission for location tracking.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, by a computing device, a request for authorization of a transaction;
   receiving, by the computing device, a claimed identity of a requester who initiated the transaction;
   receiving, by the computing device, identification information that uniquely identifies a device and an identity of a user associated with the device and history information that includes a location of the requester, via a network in response to a predetermined trigger condition indicated by a change in the location of the requestor indicated by location data from a mobile device of the requestor;
   generating, by the computing device, a risk score by comparing the identity claimed by the requestor with the received identification information and using the received history information, from the mobile device of the requestor and from at least one other device of the requestor, the risk score being directly related to an amount of the identification information and the history information that confirms the requester matches the claimed identity of the requester;
   in response to the risk score exceeding a predetermined threshold, the computing device granting the request for authorization and generating a premium associated with the granting the request for authorization, wherein the premium is determined based on the risk score, and the premium is inversely related to the risk score;

communicating, by the computing device, the premium to a third party advertising provider;

receiving, by the computing device, information indicating that the third party advertising provider has agreed to pay the premium associated with the granting the request for authorization; and providing, by the computing device, the third party advertising provider with the received identification information and the received history information, from the mobile device of the requestor and from the at least one other device of the requestor.

2. A computer program product comprising a computer readable storage medium having program instructions embodied therewith, the program instructions executable by a computing device to cause the computing device to:

receive a request for authorization of a transaction;

receive a claimed identity of a requester who initiated the transaction;

receive identification information that uniquely identifies a device and an identity of a user associated with the device and history information that includes a location of the requester, via a network in response to a predetermined trigger condition indicated by a change in the location of the requestor indicated by location data from the mobile device of the requestor;

generate a risk score by comparing the identity claimed by the requester with the received identification information and using the received history information, from the mobile device of the requestor and from at least one other device of the requestor, the risk score being directly related to an amount of the identification information and the history information that confirms the requester matches the claimed identity of the requester;

in response to the risk score exceeding a predetermined threshold:

grant a request for authorization and generate a premium associated with the granting the request for authorization, the premium being inversely related to the risk score;

communicate the premium to a third party advertising provider;

receive information indicating that the third party advertising provider has agreed to pay the premium associated with the granting the request for authorization; and provide the third party advertising provider with the received identification information and the received history information, from the mobile device of the requestor and from the at least one other device of the requestor; and in response to the risk score not exceeding the predetermined threshold, request additional identification information for the mobile device and the at least one other device of the requestor.

\* \* \* \* \*